Figure 1:
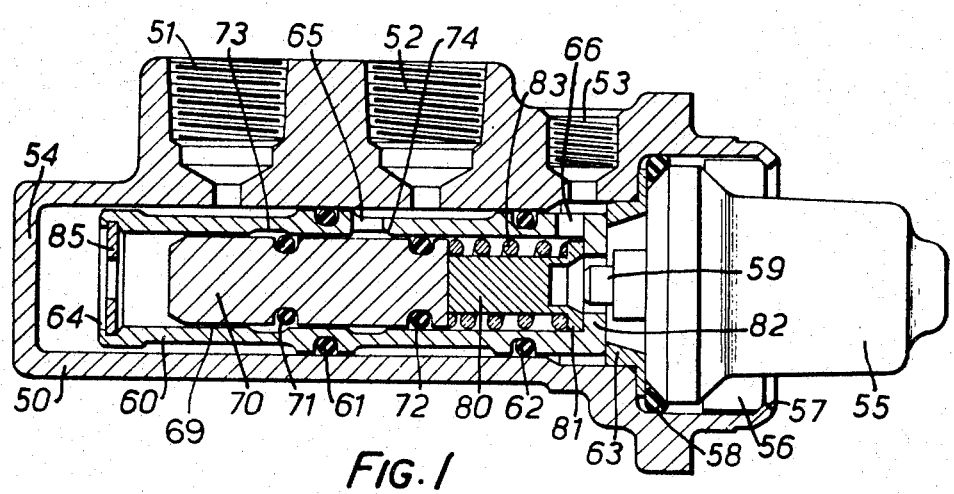

United States Patent [19]
Elmer

[11] 3,738,571
[45] June 12, 1973

[54] WAX CAPSULE VALVES
[75] Inventor: Arthur Ernest Henry Elmer, Painswick, England
[73] Assignee: Dynair Limited, Nailsworth, Gloucestershire, Great Britain
[22] Filed: May 21, 1971
[21] Appl. No.: 145,846

[52] U.S. Cl............ 236/100, 137/625.69, 192/85 A
[51] Int. Cl. ..................................... G05d 23/275
[58] Field of Search.............. 123/41.12; 192/82 T, 192/85 A; 236/101, 187, 100; 137/625.67, 625.69, 623.37

[56] References Cited
UNITED STATES PATENTS
145,846   8/1957   Herbenar........................ 123/41.12

Primary Examiner—William E. Wayner
Attorney—Young & Thompson

[57] ABSTRACT

A thermostatic valve in a pneumatic control for a clutch in a cooling fan drive has a sliding spool and two inner valve plungers to connect an actuating ram in the fan hub either to pressure or relief, the clutch being normally engaged by spring pressure. If the supply pressure falls the valve automatically shuts off the pressure to the fan and the fan clutch engages positively by the spring action.

3 Claims, 3 Drawing Figures

WAX CAPSULE VALVES

This invention relates to control valves, and particularly though not exclusively to thermally actuated valves for controlling the supply of a pressure fluid such as compressed air to an actuator such as a pneumatic ram.

The invention is applicable especially to a control valve in a pneumatic control system for a pneumatically operated clutch in the drive to a cooling fan of an internal combustion engine. It is known to provide a thermally controlled clutch in the drive to a cooling fan, to disengage the drive when the temperature of the engine falls below a selected value. This is beneficial to the operating efficiency of the engine and maintains the working temperature at a selected value or within a selected range. The valve of the present invention in its preferred form is designed for use in such a thermally controlled cooling fan drive.

Broadly stated the invention consists in a thermally actuated pneumatic control valve comprising a valve casing having an inlet port and a spaced outlet port, a hollow valve spool slidable in said casing and having external sealing means engaging said casing between said inlet and outlet ports, and an internal flow passage communicating respectively at opposite sides of said sealing means with said inlet and outlet ports, a movable valve element slidable within said valve spool to selectively open and close said flow passage, a thermal expansion element connected to said casing to be exposed externally to temperature changes, and having a movable actuator member projecting into said valve casing, spring means acting between said movable valve element and said valve spool in a direction to close said flow passage, and piston means connected to said valve element and exposed to air pressure entering said casing via said inlet port and arranged to act on said valve element in a direction opposing said spring means.

The valve preferably includes lost-motion means acting between said movable valve element and said valve spool, arranged to permit limited relative movement to open and close said flow passage during a first portion of the full range of travel of said movable actuator member, and to cause conjoint movement of said valve spool bodily with said valve element during another portion of the range of travel of said actuator member.

According to another preferred feature of the invention the valve casing has a vent port spaced from said inlet and outlet ports, and said valve spool has a further seal engaging said casing between said outlet port and said vent port, and said movable valve element includes means controlling a further flow passage within said valve spool and communicating respectively with said outlet and vent ports on opposite sides of said further seal, whereby said outlet port is selectively connected alternatively to said inlet port or said vent port.

From another aspect the invention consists in a thermally actuated clutch-controlled cooling fan assembly, including a fan hub carrying a plurality of fan blades, a clutch associated with said hub for selectively engaging and disengaging the drive to said blades, a pneumatic actuator for operating said clutch to disengage the said drive and spring means for operating said clutch to engage the said drive, a compressed air source for supplying compressed air to said actuator, and a thermally responsive valve for controlling the supply of compressed air, said valve including a valve casing, a thermal expansion element, a movable valve element engaged by said expansion element to selectively open and close a flow passage between an air inlet connected to said source, and an outlet connected to said actuator, and safety means for closing said flow passage in response to a fall in air pressure at said inlet.

In a preferred arrangement said safety means is arranged to close said flow passage at an air pressure value greater than the pressure value at which said spring means becomes operative to cause partial engagement of said clutch. For example said safety means may include a movable piston element associated with a movable valve element, and acted upon in one direction by air at said air inlet pressure, and in the other direction by a balancing spring.

Thus is an object of the invention to provide an improved temperature operated control valve which will accommodate the excess movements of a temperature actuator such as a wax capsule outside the normal temperature range of the capsule. A further object of the invention is to provide a temperature operated valve which will automatically shift to its closed position if the pressure of the fluid supply falls below a predetermined value. Yet another object of the invention is to provide a cooling fan assembly incorporating a pneumatic ram for a clutch in the drive to the fan, the ram being arranged to disengage the clutch against the force of a spring which acts to engage the clutch, so as to produce a "fail-safe" effect, and the valve acts to positively shut-off the supply of compressed air to the ram if the air pressure falls below a predetermined value, so preventing partial engagement of the clutch.

Figure 2:
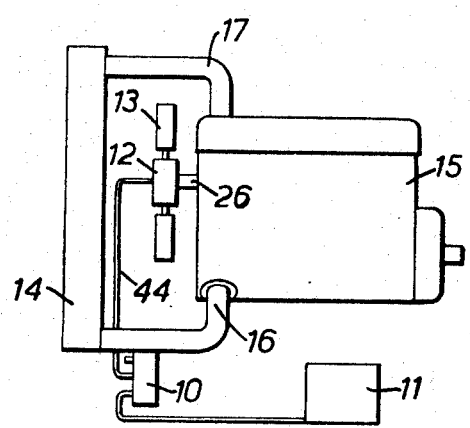
Figure 3:
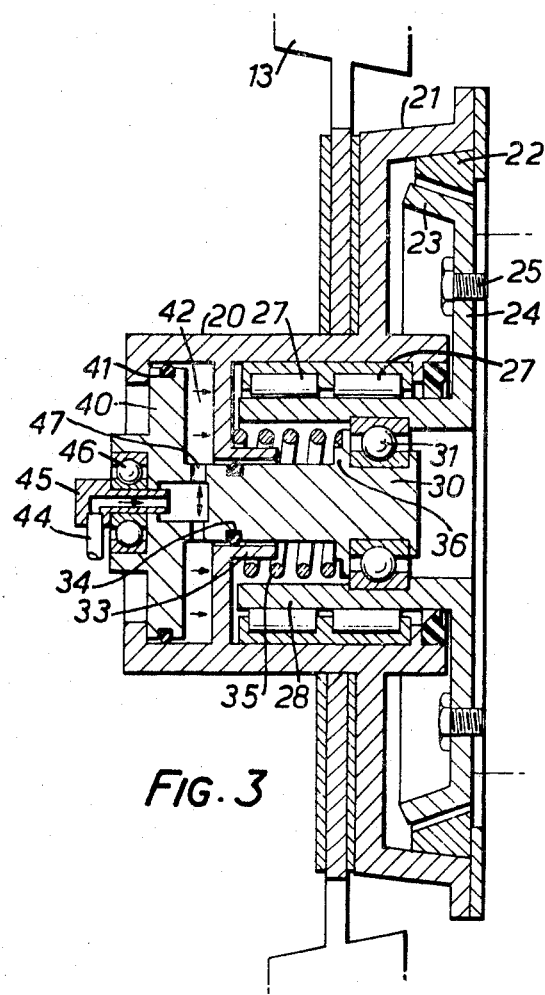

The invention may be performed in various ways and one specific embodiment will now be described by way of example with reference to the accompanying drawings, in which:

FIG. 1 is a sectional side elevation through a thermostatic control valve according to the invention, FIG. 2 is a diagrammatic illustration of a vehicle motor, with a cooling fan, and an automatic clutch control system incorporating the valve of FIG. 1, and FIG. 3 is a diagrammatic sectional elevation through the hub of the cooling fan of FIG. 2 illustrating the friction clutch and pneumatic operating ram.

Referrng first to the complete system illustrated in FIG. 2 the internal combuston engine 15 is a water cooled petrol or diesel motor arranged to drive the road wheels of the vehicle (not shown), and the motor is also arranged to drive a cooling fan having a fan hub 12 and a series of fan blades 13. The cooling circuit of the motor includes a radiator 14 through which air is drawn by the fan blades, a water hose 17 through which heated water from the engine cooling jacket passes into the upper part of the radiator, and a return hose 16 through which water cooled in the radiator returns to the engine cooling jacket. A water circulating pump (not shown) is normally included in the water circuit.

The fan hub 12 includes a friction clutch and a pneumatic operating ram, the supply of air to actuate the ram being controlled by the thermostatic valve 10 through which compressed air is delivered from a compressor or other source of compressed air 11 on the vehicle.

The fan hub as illustrated diagrammatically in FIG. 3 comprises a main rotary outer casing 20, to which the fan blades 13 are attached, the casing having a part 21 of enlarged diameter at its rear end, in which is located an annular friction ring or lining 22. This constitutes the driven element of the friction clutch. The driving element of the clutch is formed by a part-conical flange 23 on a disc 24 which can be attached by bolts 25 to a flange on the front end of a shaft 26 (see FIG. 2) driven by the engine 15. The clutch is engaged when the casing 20 moves forward relative to the disc 24, i.e. to the left in FIG. 3, and is disengaged when the casing moves in the opposite direction.

The casing 20 is supported via a pair of needle roller bearing races 27 on a hollow spigot 28 attached to the driving disc 24. These needle roller bearing races permit relative longitudinal movement of the casing 20 in addition to relative rotary movement. Mounted within the hollow spigot 28 is a stem 30, fixed axially with respect to the spigot by a ball thrust bearing 31. A radial flange 32, fixed with respect to the casing 20, projects inwards from the casing towards the stem 30 and has an inturned flange or lip 33 at its inner edge, which forms a fluid tight seal with the stem 30 via an O-ring seal 34. A helical compression spring 35 is located between this radial flange or wall 32 and a shoulder or abutment 36 on the stem, which also forms a locating shoulder for the thrust bearing 31. The spring 35 thus acts to separate the flange 32 from the should 36 and thus tends to urge the casing 20 and the clutch driven member 22 to the left, i.e. in a direction to cause the clutch to engage.

The left hand or front end of the stem 30 is formed with a radial flange 40 having an O-ring seal 41 at its outer edge to engage the inner surface of the casing 20 on the forward side of the fixed flange 32. The annular space 42 between this flange 40 and the flange 32 constitutes a pneumatic ram chamber. Compressed air is admitted to and relieved from this chamber via a flexible tube 44 connected to a non-rotary coupling element 45 which fits in a recess or socket in the front end of the stem 30 and is supported by a bearing 46. A rotary air seal (not shown) is also provided between this coupling 45 and the adjacent parts of the stem 30. As illustrated in FIG. 3 compressed air passing through the tube 44 enters the recess in the stem 30 and passes through a series of radial drillings 47 into the annular ram chamber 42. When compressed air is admitted to the ram chamber the air pressure acts in opposite directions on the two flanges 40 and 32 and since the flange 40 is integral with the stem 30 and is connected via the thrust bearing 31 the driving disc 24, this flange 40 cannot shift in an axial direction and accordingly the air pressure causes the flange 32 together with the casing 20 to shift to the right, so disengaging the cluth. Thus it will be noted in particular that the clutch is disengaged when air pressure is admitted and is engaged when the air pressure is cut off or relieved. This tends to provide a fail safe feature in that if the air pressure should for any reason fail the clutch will automatically engage by reason of the spring 35. It will also be noted however that if the air pressure should merely drop somewhat below the normal operating value the casing 20 could move progressively to the left under the action of the spring 35 until the clutch partially engages but without full engagement. This would result in clutch slip, ineffective transmission of drive to the fan blades 13 and consequent wear of the clutch surfaces. The effect however is effectively reduced or eliminated by the design of the thermostatic valve 10 as illustrated in detail in FIG. 1.

The valve illustrated in FIG. 1 comprises a main hollow generally cylindrical valve chamber or casing 50 having a compressed air inlet 51, a service outlet 52 and a vent port 53, spaced apart longitudinally along one side of the casing. One end 54 of the casing is closed and the other end is designed to receive and locate a thermostatic actuator in the form of a wax capsule 55 filled with a substance such as wax which is selected for its properties of having a relatively high thermal expansion rate at a particular selected temperature or temperature range. Such wax capsules are well known and need no further description. The capsule is located in the end of the valve casing by a ring 56 which is anchored by peening-over the end of the casing 57. The capsule is sealed to the wall of the casing by an O-ring 58. The actuating member of the capsule is in the form of a pin or plunger 59 which projects into the interior of the valve casing and the external surface of the capsule is in this embodiment exposed to the water flowing through the return hose 16. The water temperature in this return hose 16 provides the best indication of the cooling requirements of the engine and automatically takes into account such factors as variations in the temperature of the atmosphere or in the speed of movement of the vehicle.

The valve includes three main moving valve elements. The first element is in the form of a hollow spool or sleeve 60 designed to slide longitudinally within the casing and having an appreciable clearance around its external surface. The sleeve is formed with external grooves receiving O-rings 61,62 which engage and form seals with the inner surface of the valve chamber, these O-ring seals being normally positioned respectvely between the inlet and outlet ports 51,52 and between the outlet port 52 and the vent port 53. When air pressure is admitted via the inlet 51 the hollow sleeve 60 is urged to the right as illustrated in FIG. 1 and abuts against a ring 63 clamped in position by the capsule 55. The hollow sleeve 60 has an opening 64 at its left end, through which compressed air can flow from the inlet port 51, a series of radial passages 65 positioned between the sealing rings 61,62 and one or more further passages 66 adjacent its right hand end through which air can flow to the vent port 53.

The second movable valve element of the valve is in the form of a stem or plunger 70 positioned within the hollow sleeve 60 and having an appreciable clearance therefrom to allow air to flow lengthwise along an internal flow passage 69 between the two parts 60 and 70. This plunger 70 has a pair of annular grooves receiving O-rings 71,72 which engage against the internal surface of the hollow sleeve 60. This internal surface of the hollow sleeve 60 also has two annular grooves or depressions 73,74, which are of somewhat greater axial length than the respective sealing rings 71,72 and so arranged that when the sealing ring 71 is aligned with the groove 73 the seal is ineffective so that air can flow lengthwise past this seal 71. Similarly when the seal 72 is aligned with the groove 74 compressed air can pass lengthwise around the plunger 70 to the right hand end of the valve.

The third valve element is in the form of another plunger 80 which is separate from and movable independently of the plunger 70, and is also located within and spaced by a clearance from the hollow sleeve 60. The right hand end of this second plunger 80 has a recess to receive and be engaged by the actuating pin 59 of the wax capsule, and a small annular flange 81 which normally abuts against an inturned shoulder 82 on the left hand end of the sleeve 60. A light helical compression spring 83 is located around the plunger 80, one end of the spring abutting against this flange 81 and the other end abutting against the right hand end of the plunger 70.

The operation of this thermal control valve is as follows. When the temperature of the water in the return hose 16 is below the selected operating value the actuating pin 59 of the wax capsule is withdrawn to the right as illustrated in FIG 1. Compressed air which is permanently available at the air inlet 51 while the engine is running, acts in the right hand direction on the hollow sleeve 60 and also on the movable valve element 70 urging both these components to the right as shown in FIG. 1. In this position the sealing ring 71 is aligned partly with the internal groove 73 and air can thus flow through the clearance around the plunger 70 from left to right, through the radial passage 65 to the outlet 52. From this service port 52 the compressed air passes via the flexible tube 44 to the fan hub where it acts in the manner described above to cause the clutch to be disengaged. This avoids wastage of power in driving the cooling fan unnecessarily and also avoids over-cooling so that the engine temperature can more rapidly rise to its optimum value.

As the temperature of the cooling water in the return hose 16 rises the actuating pin 59 of the capsule projects into the valve chamber, engages the second valve plunger 80 and moves this plunger together with the plunger 70 to the left. After a short travel of the plunger 70 the sealing ring 71 passes beyond the groove 73 and forms sealing engagement with the internal surface of the hollow sleeve 60 beyond this groove, thus blocking off the flow of air between the air inlet port 51 and the service port 52. Simultaneously (or preferably shortly afterwards when the plunger 70 has moved a further short distance to the left) the second sealing ring 72 becomes aligned with the groove 74, and this interrupts the seal between the service port 52 and the vent port 53 so that air from the service port and the pneumatic ram chamber 42 can exhaust via the vent port 53.

If the water temperature continues to rise and the capsule actuating pin 59 extends further to the left, the left hand end of the plunger 70 engages a spring clip 85 positioned in the left hand end of the hollow sleeve 60 and further movement of the actuating pin 59 causes the sleeve 60 to move bodily to the left together with the two plungers 70 and 80. This avoids imposing any restraint on the actuating element of the wax capsule and also avoids the need for excessve longitudinal intervals between the seals 71 and 72 and between the annular grooves 73,74. If the temperature of the cooling water in the hose 16 should fall the actuating pin 59 will return or withdraw into the capsule and the sequence of operations is reversed; firstly the service port 52 is disconnected from the vent port 53, and subsequently reconnected with the air inlet 51, thus again admitting compressed air to the ram of the clutch so that the clutch is disengaged.

As explained above the valve also includes means for avoiding partial engagement of the clutch if the inlet air pressure should fall below a predetermined value. This is achieved by the light compression spring 83 which tends to separate the two plungers 70 and 80. Normally any pressure at the air inlet 51 acts on the left hand end of the plunger 70 and causes this plunger to abut against the end of the plunger 80, whose movements are controlled by the capsule actuating pin 59. The air pressure is normally more than sufficient to overcome the force of the spring 83. If the air pressure should fall for any reason then at a predetermined pressure the spring 83 will over come the effect of the pressure acting on the left hand end of the plunger 70 and will cause this plunger to move relatively to the left until it auts against the spring clip 85 so that the seal 71 forms sealing engagement with inner surface of the sleeve 60 and so blocks communication between the air inlet 51 and the service port 52. This shut-off is positive and in the present example occurs when the inlet air pressure falls below 65 p.s.i. This value is selected to be above the value (in this example about 55 p.s.i.) at which the clutch would itself tend to engage as a result of a fall in pressure in the actuating ram chamber 42. In other words the valve will automatically shut off the compressed air supply to the fan clutch before the air pressure has fallen to a point at which the clutch itself would automatically tend to disengage. Thus the action of the clutch in the event of a failure or partial failure of the air supply will be positive so that the clutch will engage fully, so providing a full drive to the fan blades and avoiding wear of the clutch surfaces.

I claim:

1. A thermally actuated pneumatic control valve, comprising a valve casing having an inlet port and a spaced outlet port, a hollow valve spool slidable in said casing and having external sealing means engaging said casing between said inlet and outlet ports, and an internal flow passage communicating respectively at opposite sides of said sealing means with said inlet and outlet ports, a movable valve element slidable within said valve spool to selectively open and close said flow passage, a thermal expansion element connected to said casing to be exposed externally to temperature changes, and having a movable actuator member projecting into said valve casing and acting on at least said movable valve element in a direction to close said flow passage upon thermal expansion, and spring means acting between said movable valve element and said valve spool in a direction to close said flow passage, said movable valve element being exposed to air pressure entering said casing via said inlet port and acting on said valve element in a direction opposing said spring means.

2. A control valve according to claim 1, including lost motion means acting between said movable valve element and said valve spool, arranged to permit limited relative movement to open and close said flow passage during a first portion of the full range of travel of said movable actuator member, and to cause conjoint movement of said valve spool bodily with said valve element during another portion of the range of travel of said actuator member.

3. A control valve according to claim 1, in which said valve casing has a vent port spaced from said inlet and outlet ports, and said valve spool has a further seal engaging said casing between said outlet port and said vent port, and said movable valve element includes means controlling a further flow passage within said valve spool and communicating respectively with said outlet and vent ports on opposite sides of said further seal, whereby said outlet port is selectively connected alternatively to said inlet port or said vent port.

* * * * *